US008447862B2

(12) United States Patent
Sakata et al.

(10) Patent No.: US 8,447,862 B2
(45) Date of Patent: May 21, 2013

(54) GLOBAL LOAD BALANCING ON A CONTENT DELIVERY NETWORK

(75) Inventors: Jay Sakata, Stevenson Ranch, CA (US); Alex Kazerani, Los Angeles, CA (US); Phil Goldsmith, Santa Monica, CA (US)

(73) Assignee: Edgecast Networks, Inc., Santa Monica, CA (US)

( * ) Notice: Subject to any disclaimer, the term of this patent is extended or adjusted under 35 U.S.C. 154(b) by 0 days.

(21) Appl. No.: 13/457,249

(22) Filed: Apr. 26, 2012

(65) Prior Publication Data

US 2012/0215915 A1 Aug. 23, 2012

Related U.S. Application Data

(63) Continuation of application No. 12/221,724, filed on Aug. 6, 2008, now Pat. No. 8,180,896.

(51) Int. Cl.
*G06F 15/173* (2006.01)
*G06F 15/16* (2006.01)

(52) U.S. Cl.
USPC ............ 709/226; 709/223; 709/225; 709/218

(58) Field of Classification Search
USPC .......................................... 709/226
See application file for complete search history.

(56) References Cited

U.S. PATENT DOCUMENTS

| | | | |
|---|---|---|---|
| 6,064,671 A | 5/2000 | Killian | |
| 6,249,801 B1 * | 6/2001 | Zisapel et al. ................ 718/105 |
| 6,958,707 B1 | 10/2005 | Siegel | |
| 7,500,243 B2 * | 3/2009 | Huetsch et al. ............... 718/105 |
| 7,587,500 B2 * | 9/2009 | Rozen ........................... 709/229 |
| 7,945,693 B2 | 5/2011 | Farber et al. | |
| 2002/0103846 A1 | 8/2002 | Zisapel et al. | |
| 2003/0115283 A1 | 6/2003 | Barbir et al. | |
| 2003/0174648 A1 | 9/2003 | Wang et al. | |
| 2004/0044744 A1 | 3/2004 | Grosner et al. | |
| 2004/0078481 A1 | 4/2004 | Rudd et al. | |
| 2005/0021863 A1 | 1/2005 | Jungck | |
| 2005/0188073 A1 | 8/2005 | Nakamichi et al. | |
| 2006/0112170 A1 | 5/2006 | Sirkin | |
| 2009/0172192 A1 | 7/2009 | Christian et al. | |
| 2009/0177756 A1 | 7/2009 | Gunda et al. | |
| 2009/0177778 A1 | 7/2009 | Turk | |

* cited by examiner

*Primary Examiner* — Douglas Blair
*Assistant Examiner* — Angela Nguyen
(74) *Attorney, Agent, or Firm* — Los Angeles Patent Group; Arman Katiraei

(57) ABSTRACT

The invention relates to systems and methods of global load balancing in a content delivery network having a plurality of edge servers which may be distributed across multiple geographic locations. According to one aspect of the invention, a global load balancing system includes a first load balancing server for receiving a packet requesting content to be delivered to a client, selecting one of the plurality of edge servers to deliver the requested content to the client, and forwarding the packet across a network connection to a second load balancing server, which forwards the packet to the selected edge server. The selected edge server, in response to receiving the packet, sends across a network connection the requested content with an address for direct delivery to the client, thereby allowing the requested content to be delivered to the client while bypassing a return path through the first load balancing server.

18 Claims, 9 Drawing Sheets

GLOBAL LOAD BALANCING ON A CONTENT DELIVERY NETWORK

CROSS-REFERENCE TO RELATED APPLICATIONS

This application is a continuation of U.S. application Ser. No. 12/221,724, filed Aug. 6, 2008, now U.S. Pat. No. 8,180,896, the entire contents of which are incorporated herein by reference.

FIELD OF THE INVENTION

The invention relates to systems and methods for servicing requests across a wide area data network.

BACKGROUND OF THE INVENTION

Today, the Internet continues to grow as a medium for delivering content. One of the factors driving the growth and success of the Internet as a medium for delivering content is the proliferation of high-speed Internet access to the home. This access provides a high quality data channel to the home of consumers, allowing for marketers and other individuals to provide quality commercial video and audio to the home user. Thus, the Internet offers a high quality and flexible medium for presenting content to the end user.

As the popularity of the Internet grows, more and more people rely on the Internet for getting their information and entertainment. High speed transfer of media rich content, such as video and audio, is readily available now over the Internet. One example is that some television networks, such as ABC, offer videos of earlier aired episodes of popular television shows. As such, the day after the airing of the television show, the website associated with the downloadable video is often heavily accessed by users wishing to download the video. The demand of multiple users requesting large data files places a burden on the content provider to come up with ways to deliver the content effectively and with a high quality of service. To this end, engineers have developed the content delivery network and service.

One example of a content delivery network and service is the network and service offered by the Akamai Company of Cambridge, Mass. Akamai provides a content delivery service that cost effectively delivers content across the Internet. To that end, Akamai established a content delivery network that comprises a set of servers, called edge servers, that are disposed at certain network locations on the Internet. These network locations correspond to geographic locations that have been determined by Akamai to be proximate to a large number of Internet users. Thus, the edge servers are placed at a location where they are physically close to a large number, if not the majority, of Internet users and as such they are described as being at the edge of the network, at the point right before Internet connects to the home user. Delivering content from these edge servers down to local users is thus understood as quick and relatively affordable. By contracting with Akamai, a content owner can store their content at these edge servers. When the home user requests content from the content provider, Akamai can deliver that content to the user from the closest edge server, by identifying the edge server that has the requested content and that is most proximate to that user.

In another example, a content delivery network places edge servers at efficient locations on the Internet and provides a load balancing function that could balance the load of multiple requests coming in bursts. The load balancing process would reallocate these requests to different edge servers across the content delivery network and thereby distribute the burden of delivering heavily requested content across multiple data processing platforms.

Thus, the content delivery networks act as large cache systems that strategically locate servers across the Internet and store content for delivery to an end user, while balancing the load of data requests from multiple users.

Although today's content delivery networks can work quite well and provide the content owner with tools for efficient and effective delivery of large data files, there is a need in the art to provide for more robust mechanisms for allowing content owners to ensure how their content files are delivered efficiently over the content delivery networks.

SUMMARY OF THE INVENTION

The systems and methods described herein provide a global load balancing device that can be used on a content delivery network. The global load balancing device may allocate traffic across the content delivery network to distribute requests across the different edge servers that are stored on that network. This in turn provides for greater performance and efficiency in dealing with requests from multiple users. In addition, the global load balancing device may regulate relative traffic load across multiple geographic locations of the content delivery network by managing sets of IP addresses advertised by routing tables of routers located at the multiple geographic locations.

According to one aspect of the invention, a global load balancing system for use in a content delivery network having a plurality of edge servers includes a first load balancing server for balancing a load across the plurality of edge servers. The first load balancing server includes an input port for receiving a packet requesting content to be delivered to a client, a processor for selecting one of the plurality of edge servers to deliver at least a portion of the content requested by the packet to the client, and a packet switch for forwarding the packet across a network connection to a second load balancing server. The second load balancing server has a packet switch for forwarding the packet to the selected edge server of the plurality of edge servers. The selected edge server, in response to receiving the packet, sends across a network connection at least a portion of the requested content with an address for direct delivery to the client, thereby allowing the at least a portion of the requested content to be delivered to the client while bypassing a return path through the first load balancing server.

In some embodiments, the plurality of edge servers are distributed across multiple geographical locations, where the distribution is based at least in part on population density corresponding to the multiple geographical locations.

In some embodiments, the processor selects the selected edge server based at least in part on cost of delivering the at least a portion of the requested content from the selected edge server, edge server load, edge server availability, file type, network latency, proximity, or speed of transfer to the client.

In some embodiments, the first load balancing server is located at a first geographical location associated with a first router having a first routing table that advertises a first set of IP addresses; while the second load balancing server is located at a second geographical location associated with a second router having a second routing table that advertises a second set of IP addresses. The first routing table advertises an IP address identical to one advertised by the second routing table.

According to another aspect of the invention, a method of load balancing across a content delivery network having a plurality of edge servers is provided. The method includes the steps of providing a first load balancing server for balancing a load across the plurality of edge servers and for receiving a packet requesting content to be delivered to a client, selecting one of the plurality of edge servers to deliver at least a portion of the content requested by the packet to the client, and operating the first load balancing server to forward the packet across a network connection to a second load balancing server. At the second load balancing server, the method includes the step of forwarding the packet to the selected edge server of the plurality of edge servers. The selected edge server, in response to receiving the packet, sends across a network connection at least a portion of the requested content with an address for direct delivery to the client, thereby allowing the at least a portion of the requested content to be delivered to the client while bypassing a return path through the first load balancing server.

According to another aspect of the invention, a global load balancing system for use in a content delivery network having a plurality of edge servers distributed across multiple geographical locations includes first and second load balancing servers for balancing a load across the plurality of edge servers. The first load balancing server is located at a first geographical location and associated with a first router having a first routing table that advertises a first set of IP addresses. The second load balancing server is located at a second geographical location and associated with a second router having a second routing table that advertises a second set of IP addresses. The first routing table advertises an IP address identical to one advertised by the second routing table. In some embodiments, the first load balancing server includes an input port for receiving a packet requesting an IP address advertised by the first routing table and a packet switch for forwarding the packet for receipt by an edge server that delivers content associated with the requested IP address to the client. The packet may use one of HTTP, FTP, RTMP, and MMS as a communications protocol. In some embodiments, the first load balancing server includes a processor for selecting the edge server to receive the forwarded packet based at least in part on at least one of edge server load, edge server availability, file type, network latency, proximity, and speed of transfer to the client.

In some embodiments, the global load balancing system includes an input port for receiving data indicative of a performance status of at least one edge server associated with the first geographical location, where the performance status indicates how well an edge server will deliver content identified by IP addresses, and a processor for managing the first set of IP addresses advertised by the first routing table of the first router based at least in part on the performance status. The processor may use a Border Gateway Protocol to manage the first set of IP addresses advertised by the first routing table. In some implementations, the processor removes at least one IP address from the first set of IP addresses, so that the first routing table no longer advertises the removed IP address, when the performance status of at least one edge server associated with the first geographical location indicates an inability to deliver content in response to a packet requesting content. In some implementations, the processor removes at least one IP address from the first set of IP addresses, so that the first routing table no longer advertises the removed IP address, when the performance status of at least one edge server associated with the first geographical location indicates that delivery of content in response to a packet requesting content does not satisfy a desired quality of service level. In some implementations, the processor adds at least one IP address to the first set of IP addresses, so that the first routing table advertises the added IP address, when the performance status of at least one edge server associated with the first geographical location indicates an ability to deliver content in response to a packet requesting content. In some implementations, the processor adds at least one IP address to the first set of IP addresses, so that the first routing table advertises the added IP address, when the performance status of at least one edge server associated with the first geographical location indicates that delivery of content in response to a packet requesting content does satisfy a desired quality of service level.

According to another aspect of the invention, a method of load balancing across a content delivery network having a plurality of edge servers distributed across multiple geographical locations is provided. The method includes the steps of providing first and second load balancing servers for balancing a load across the plurality of edge servers. The first load balancing server is located at a first geographical location and associated with a first routing table that advertises a first set of IP addresses. The second load balancing server is located at a second geographical location and associated with a second routing table that advertises a second set of IP addresses. The first routing table advertises an IP address identical to one advertised by the second routing table.

In some embodiments, the method includes the step of operating the first load balancing server to forward a packet requesting the IP address across a network connection for receipt by an edge server that delivers content associated with the IP address to the client. The packet may use one of HTTP, FTP, RTMP, and MMS as a communications protocol. In some embodiments, the method includes the step of selecting the edge server to receive the forwarded packet based at least in part on at least one of edge server load, edge server availability, file type, network latency, proximity, and speed of transfer to the client.

In some embodiments, the method includes the step of regulating a relative traffic load at the first and second geographical locations by regulating a first set of IP addresses advertised by the first routing table and a second set of IP addresses advertised by the second routing table. In some implementations, the step of regulating a relative traffic load includes removing an IP address, which is identical to one in the second set of IP addresses, from the first set of IP addresses so that the first routing table no longer advertises the IP address and the second routing table continues to advertise the IP address. In some implementations, the step of regulating a relative traffic load includes determining a number of IP addresses to remove from the first set of IP addresses, based at least in part on a magnitude of a desired decrease in traffic load at the first geographical location, relative to traffic loads at other geographical locations of the content delivery network, and removing the determined number of LP addresses from the first set of IP addresses so that the first routing table no longer advertises the removed IP addresses.

In some embodiments, the method includes the steps of monitoring a first traffic load associated with the first geographical location, monitoring a second traffic load associated with the second geographical location, and regulating a relative traffic load at the first and second geographical locations by modifying at least one of the first and second sets of IP addresses based at least in part on the monitored first and second traffic loads. The modifying may include removing or adding an IP address to at least one of the first and second sets of IP addresses.

BRIEF DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATED EMBODIMENTS

Figure 1:
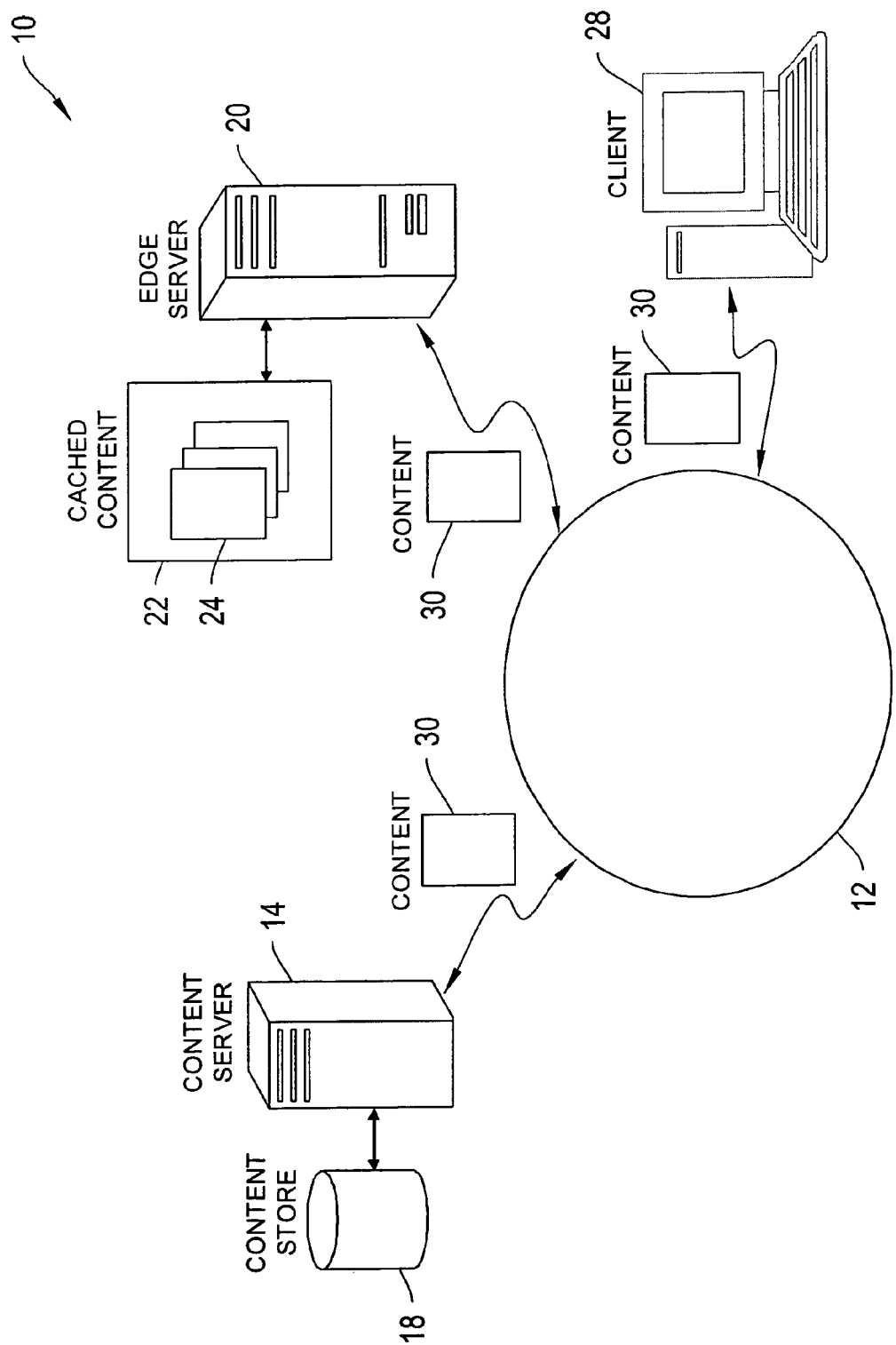
FIG. 1 depicts an exemplary system for a content delivery network, according to an illustrative embodiment of the invention.

To provide an overall understanding of the invention, certain illustrative embodiments will now be described, including a system that allows a content delivery network to balance a load by redirecting users to edge servers that are most capable of handling the request. However, it will be understood by one of ordinary skill in the art that the systems and methods described herein may be adapted and modified for other suitable applications and that such other additions and modifications will not depart from the scope hereof.

Thus, in one aspect, the invention provides systems that receive requests for data from a client. In these cases the data being requested is stored on a content delivery network. The client request is typically generated as a client, typically a browser, is resolving a link on a web page where that link points to content stored on the content delivery network. The client request may take the form of a packet transmitted from the client to a load balancing server on the content delivery network to which the link resolves. The load balancing server will detect the request and process it based on the requested information, or examine it to determine the requested content. The load balancing server will determine which edge server should serve the requested content. In some embodiments, the load balancing server may have a processor that applies an algorithm that will consider parameters, such as server resources, server availability, delivery costs, network resources, file type and other parameters, and determine the edge server best-suited, based on the considered parameters, for transferring the requested content directly to the user. For example, the load balancing server in one location might have a 100 ms network latency back to the user, but it might be aware that at another location the load balancing server is only 20 ms away from the user; therefore the load balancing server at the first location might forward the client request to the second location where the other load balancing server is physically connected to the network, so that the load balancing server at the second location can forward the client request to one of the edge servers at the second location. Thus, it will be understood that the load balancing server may redirect a packet requesting content to an edge server.

The invention may enhance load balancing by using AnyCast routing at the load balancer level, and automatically advertising or removing AnyCast routes based on a number of different parameters such as load on the edge servers handling user requests. The global load balancing devices located at multiple locations within the content delivery network could have the same Internet Protocol (IP) addresses as each other, where an IP address may be a numerical identification assigned to devices participating in a computer network utilizing the Internet Protocol for communication between its nodes. In particular, by advertising the same IP addresses on the Internet they would impact Internet routing tables in such a way where users would be directed to the closest device (edge location within the content delivery network) from a routing stand point. For example, the load balancing devices may use a route-advertising method commonly known as AnyCast routing. In some embodiments, the invention would encompass an automated structure for the global load balancing device to add or remove these route advertisements based on user requests, capacity of content delivery servers, network latency and other factors within that edge location of a content delivery network or based on data from other edge locations. As such, in some embodiments, the invention provides the ability for a content delivery network to control or regulate how much traffic is sent to each location that advertises addresses using AnyCast routing. Although the systems and methods described herein may refer to Internet Protocol addresses or other protocol-specific features, the invention generally may apply to any computer network using a communications protocol having a corresponding scheme for logical or network layer addresses.

Turning to FIG. 1, an exemplary system for a content delivery network, according to an illustrative embodiment of the invention, is depicted. The depicted system has an edge server that includes a cache memory for storing content requested by a client or a user. In particular, FIG. 1 depicts a content delivery network 10 that includes a computer network 12 such as a wide area network like the Internet, a content server 14 that has a content store 18, an edge server 20 having a cache memory 22 with cache content 24 stored therein, a client or user 28 and content 30 that is moved about the network. System 10 depicted in FIG. 1 can be any computer network, but in the embodiments described herein the system 10 will be a content delivery network of the type that operates on the Internet and the computer network 12 depicted in FIG. 1 will be understood to be the Internet. The content server 14 may be any suitable computer system capable of storing and delivering content and will typically be a data server that stores web pages and video content that may be requested over the Internet by a client, such as the depicted client 28. The client 28 may be an application running on a personal computer of a user desiring to receive content available on the Internet on the personal computer.

In the embodiment depicted in FIG. 1, the content store 18 may be a data memory that stores video content, audio content, web pages and any other kind of content that may be transferred over the network 10. Usually, the content store 18 is a set of web pages and media files, or the data store can be a database. The database can be any suitable database system, including the commercially available Microsoft Access® database, and can be a local or distributed database system. The design and development of suitable database systems are described in McGovern et al., A Guide To Sybase and SQL Server, Addison-Wesley (1993). The database can be supported by any suitable persistent data memory, such as a hard disk drive, RAID system, tape drive system, floppy diskette, or any other suitable system. The system depicted in FIG. 1 depicts the content store 18 as a database device that is separate from the content provider's server platform, however, it will be understood by those of ordinary skill in the art that in other embodiments the database device can be integrated into the system 14.

The content server 14 can be maintained by the content provider within its facility or at a hosting site such as that provided by the Web.com Company of Atlanta, Ga. At the hosting site, the hardware and software needed for running a website is maintained. The content provider, such as the event promoter discussed above, may store content in the content store 18 and may configure web server software executing on the content server 14 so that a website having the content, applications and features desired by the content provider is set up for users to access and interact with. The depicted content server may be any server that generates and serves web pages, images, video, audio or other types of files. The computer platform of the content server may be any suitable server such as an Intel based server running Microsoft Windows Operating System or Linux Operating System.

The web server executing on the content server 14 is typically an HTTP server process and may be any suitable server process including the Apache server or a streaming server handling real time protocols. Suitable servers are known in the art and are described in Jamsa, Internet Programming, Jamsa Press (1995), the teachings of which are herein incorporated by reference. In one embodiment, the HTTP server process serves HTML pages representative of content, such as static web pages, or dynamically generated web pages, such as search request web pages, to client processes making requests for such pages. An HTTP server listener process may be an executing computer program operating on the server 14 and which monitors a port and listens for client requests to transfer a resource file, such as a hypertext document, an image, audio, animation, or video file from the server's host to the client process host. In one embodiment, the client process employs the hypertext transfer protocol (HTTP) wherein the client process transmits a file request that specifies a file name, an Internet location (host address), and a method, such as the HTTP, or any other proprietary or standard protocol suitable to retrieve the requested file. The HTTP server listener process detects the client request and passes the request to the executing HTTP server processors. It will be apparent to one of ordinary skill in the art, that a plurality of HTTP server processes can be executing on the server 14 simultaneously. The HTTP server processors can pass the file request typically round-robin style until an HTTP server process is identified that is available to service the client's request.

The edge server 20 depicted in FIG. 1 may be part of a content delivery network that is set up over the network 12. The structure and operation of the edge server may be similar to the structure and operation of the content provider server 14 discussed above, and may include a web server process, and a database system. The content delivery network may be realized as a collection of these edge servers that are located at positions on the network 12 that are proximate to a substantial number of users requesting data across the network 12. In particular, the edge servers may be distributed across multiple geographical locations, where the distribution is based at least in part on the population densities corresponding to the multiple geographical locations.

In one example, the content delivery network is a network such as the Akamai content delivery network (CDN) or the Edgecast content delivery network. These CDNs may identify locations on the network that are intersection points where a number of traffic flows come together. The CDN places its edge servers at these intersection points and it is understood that the content stored at those edge servers 20 may be delivered more quickly and efficiently than content stored at other locations on the network. In the system depicted in FIG. 1, the edge server 20 has a cache memory 22 into which cached content 24 is stored. The cached content 24 is content that the edge server maintains locally as the edge server determines that this content is often requested by users 28. By storing that commonly requested content locally, the edge server 20 may reduce the amount of content that has to be sent directly from the content server 14 to the client 28. However, the systems and methods described herein are not limited to use with any particular type of network or CDN and the criteria selected by a CDN for the location of the edge servers and the number of edge servers used on the network can vary.

The client 28 may be any user system running a data processing platform that has a client process, typically called a browser, capable of accessing web content over the network 12. As shown in FIG. 1, content 30 is transmitted from either the content server 14 or the edge server 20 to the client 28 when the client 28 makes an HTTP request through its browser. The client process may be a computer program operating on the client station 28, that is capable of downloading and responding to computer files served by the server 14. In particular, the client process may be a browser program that is capable of forming one or more connections to an HTTP server process for transferring content from the HTTP server process to the client process. Such a browser process can be the Netscape Navigator browser process, the Microsoft Explorer browser process, or any other conventional or proprietary browser process capable of downloading pages or other content served by the server 14. The client 28 may be a computer system, a wireless phone, and handheld computer, a network device, or any other type of client capable of requesting data over the network 12.

Figure 2:
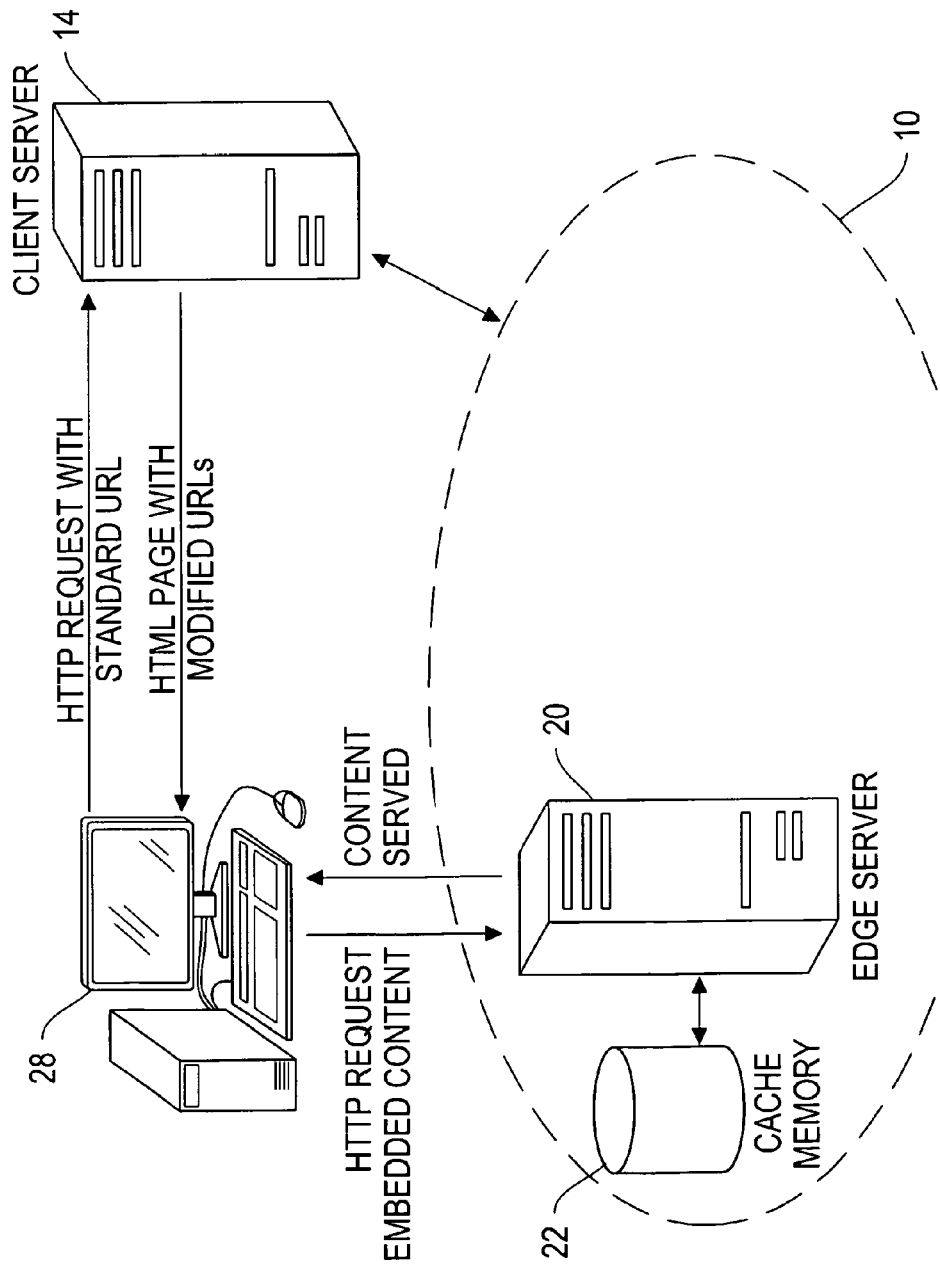
FIG. 2 depicts an exemplary process by which a client requests content that is stored on a content delivery network, according to an illustrative embodiment of the invention.

FIG. 2 depicts an exemplary process by which a client, typically a web browser, requests content that is stored on a content delivery network, according to an illustrative embodiment of the invention. Specifically, FIG. 2 depicts the flow of content over a network. In particular, FIG. 2 shows that the content delivery network 10 allows for high performance content delivery by directing requests for content or objects to the content delivery network servers, and by balancing the load of incoming requests.

FIG. 2 illustrates how the website at server 14 may operate after certain embedded objects in a web page have been modified to point to locations on the content delivery network. As illustrated in FIG. 2, the content provider's web server 14 serves the basic or base HTML page, although this is not a requirement, to the client 28. The URLs of the embedded objects within that page have been modified as known in the art and no longer resolve to the content provider's site at server 14 in the first instance, but rather resolve to the content delivery network 10. Thus when the client 28 requests content from the content provider's sites, the content delivered to the client 28 may include HTML codes that include the modified URLs that point to media rich content stored on edge servers 20 located on the content delivery network 10.

Typically, at the user's computer 28 the modified URLs are resolved and the user's browser makes a request directed to the edge server that is closest to the client 28 and that contains the requested content. In response to receiving the request, the edge server 20 may fetch from its cache memory 22 the requested content and deliver it to the client 28 so that the delivered content gets integrated into the web page delivered from the content owner's site 14. Thus, the system depicted in FIG. 2 may store content, such as video files, audio files or other large typically media rich data files. The content delivery network 10 is designed to improve the delivery of content to the client by positioning servers at the edge of the network. This makes the content delivery network 10 a useful tool for delivery of content to clients. As such, many clients may request content from the network, and this may lead to, at times, a high volume of content requests being sent to the content delivery network 10.

Figure 3:
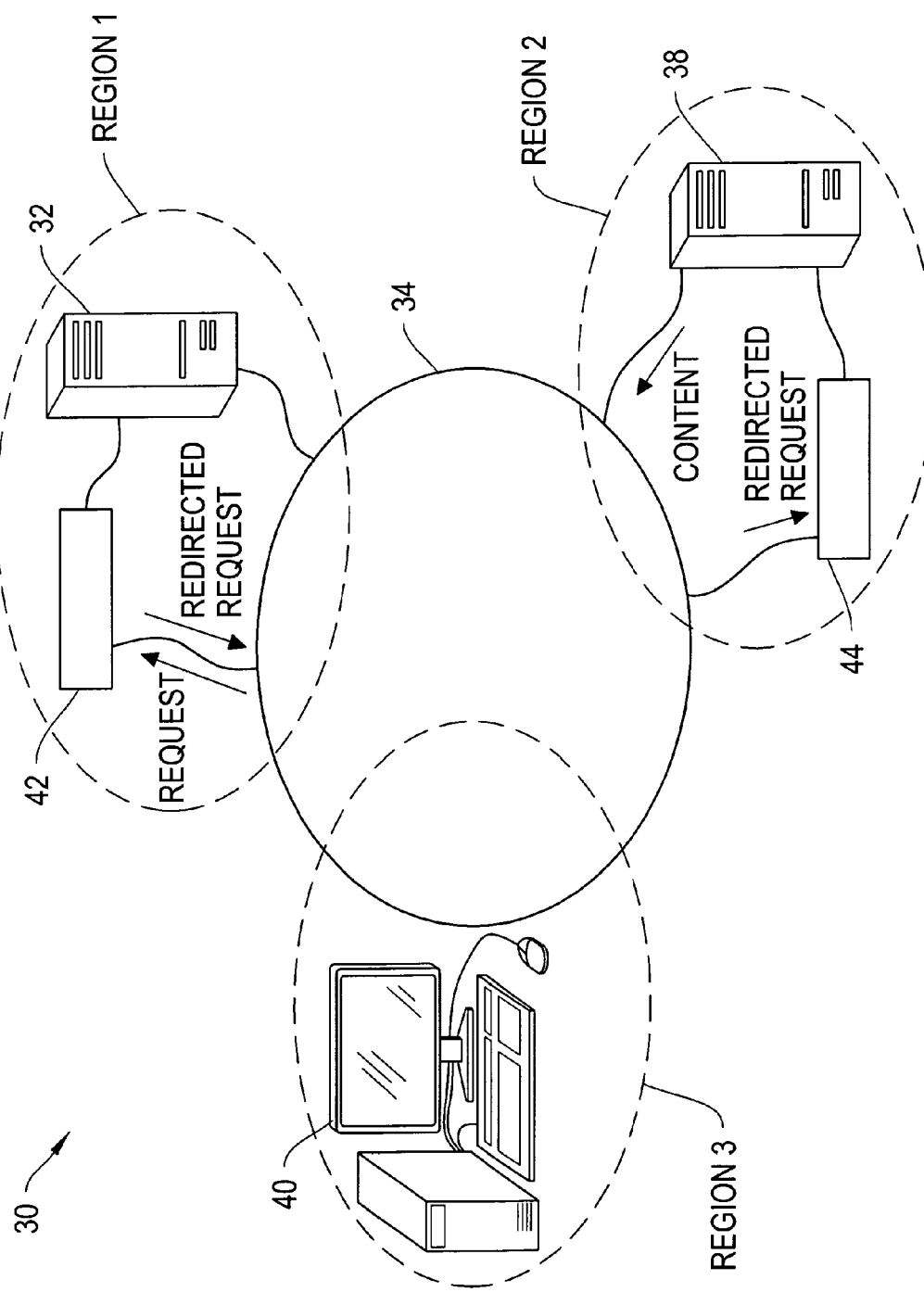
FIG. 3 depicts an exemplary content delivery network with a load balancing system that will distribute requests from clients across different edge servers, according to an illustrative embodiment of the invention.

FIG. 3 depicts an exemplary content delivery network 30 with a load balancing system that will distribute requests from clients across different edge servers, so that the delivery of content will be efficient and cost effective, according to an illustrative embodiment of the invention. In particular, FIG. 3 depicts a content delivery network 30 that has three separate geographic regions. Region 1 includes an edge server 32 located within the region and coupled to a wide area network 34, which in this embodiment is the Internet. FIG. 3 further depicts a second region, Region 2, that also includes an edge server 38 that couples to the network 34, and a Region 3 that includes a client system 40, typically a browser that can make requests that will be delivered across the network 34 to the edge servers 32 or 38 in either Region 1 or Region 2, respectively. FIG. 3 also shows that both Regions 1 and 2 have a load balancing server, 42 and 44, respectively. Load balancing servers 42 and 44 can each be a specific purpose appliance or a server configured to serve as a global load balancer. It may generally have more than one network interface card, adequate processing power (e.g. a CPU), and memory. Regions 1, 2, and 3 may correspond to different geographical locations of wide area network 34. For example, each region may correspond to a different city, each being associated with a node of wide area network 34. A client request may take the form of a packet representative of a request for content and capable of travelling through the network. The packet may use one of hypertext transfer protocol (HTTP), file transfer protocol (FTP), real time messaging protocol (RTMP), and Microsoft Media server (MMS) as a communications protocol.

As discussed above with reference to FIG. 2, an embedded object in a web page may resolve to an edge server on the content delivery network 30. As the request comes into the edge server of a region, the load balancing server associated with that region may receive the request and process the request to determine which edge server on the content delivery network 30 is best suited for handling this particular request. For example, FIG. 3 depicts that the request made by the client 40 is first delivered to the edge server 32 in Region 1. That is, the embedded object for the media content on the page delivered to the client browser resolves to edge server 32 and Region 1. As FIG. 3 also depicts, the edge server 32 couples to a load balancing server 42 that may have an input port on which to receive the packet representative of the client request, where a port may be a transport layer point in a computer network for purposes of receiving or transmitting data. The load balancing server 42 will review the request and determine based on the application of an algorithm which edge server on the network 30 is best suited for delivering the content directly to the client 40 in Region 3. To this end, the load balancing server 42 may have a processor that applies an algorithm that will consider different parameters, including network resources, costs of delivering a file to Region 3, and other parameters and in doing so can determine which edge server in which region of the network 30 is best suited for responding to the client request. For example, the algorithm may select an edge server of the network 30 based on the cost of delivering at least a portion of the content requested by the client from the selected edge server. Other parameters that the algorithm may consider in selecting an edge server include edge server load, edge server availability, file type, network latency, proximity, and speed of transfer to the client.

In the embodiment depicted in FIG. 3, the client request is redirected from the load balancing server 42 in Region 1 to the edge server 38 in Region 2. In particular, the load balancing server may have a switch for forwarding the packet representative of the client request across a network connection of the network 34 to Region 2. In some embodiments, the switch is a packet switch, which generally is capable of storing and forwarding packets at a node in a computer network that uses the packet switching paradigm for data communication. As shown in FIG. 3, the redirected request can come into the load balancing server 44 corresponding to the edge server 38 in Region 2, where it can be determined that this request has been previously processed and determined by the load balancing server 42 at Region 1 to be best served by the remotely located edge server 38 at Region 2.

The load balancing server 44 at Region 2 can pass the redirected request directly to an edge server 38. In particular, the load balancing server 44 may have a switch, such as a packet switch, for forwarding the packet representative of the client request to edge server 38. In response to receiving the client request, the edge server 38 sends at least a portion of the content requested, along with an address for delivery direct to the client 40 located in Region 3, across a network connection of network 34, as depicted in FIG. 3. The content delivered by the edge server 38 of Region 2 to the client 40 thereby bypasses a return path through the load balancing server 42 of Region 1. In this way, content requested by the client 40 in Region 3 may be serviced by the edge server 38 in Region 2 which has been determined by the content delivery network load balancing mechanism to be the most effective edge server for responding to this request.

Figure 4:
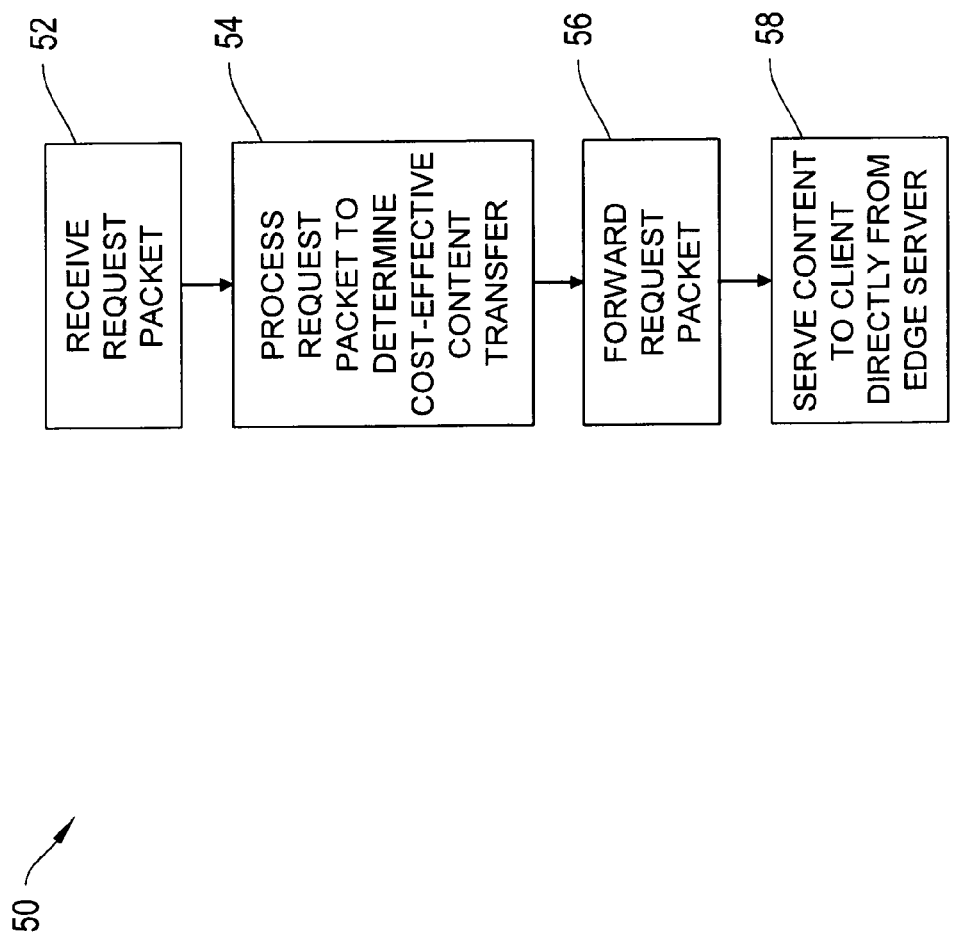
FIG. 4 depicts a flow chart diagram of an exemplary process for balancing the load of incoming requests across the edge servers maintained on a content delivery network, according to an illustrative embodiment of the invention.

FIG. 4 depicts a flow chart diagram of an exemplary process 50, according to an illustrative embodiment of the invention, for balancing the load of incoming requests across the edge servers maintained on a content delivery network. In particular, FIG. 4 depicts a process that starts with a first step 52 of receiving a packet requesting content to be delivered to a client. The packet is then processed to determine the most cost-effective content transfer operation the content delivery network can undertake. Thus in this step 54 the process 50 is choosing a delivery that will provide the most cost-effective delivery of content. In particular, the process 50 may at step 54 select an edge server to deliver at least a portion of the content requested by the packet received at step 52 to the client, where the edge server is selected based on the cost of delivering that portion of the content requested by the client from the selected edge server. It will be understood that in other practices, the process 50 implemented by a load balancing server may identify other parameters, such as a desired quality of service level to be attained, and can choose the edge server on the network most capable of delivering content at that level of quality of service. Still other practices may identify other parameters or a combination of parameters that may be considered when choosing the content transfer process to take, such as edge server load, edge server availability, file type, network latency, proximity, and speed of transfer to the client. Returning to FIG. 4, in a subsequent step 56 the request packet is then forwarded to the selected edge server determined at step 54. After this step, content from the selected edge server in step 58 will be served directly to the requesting client.

Figure 5:
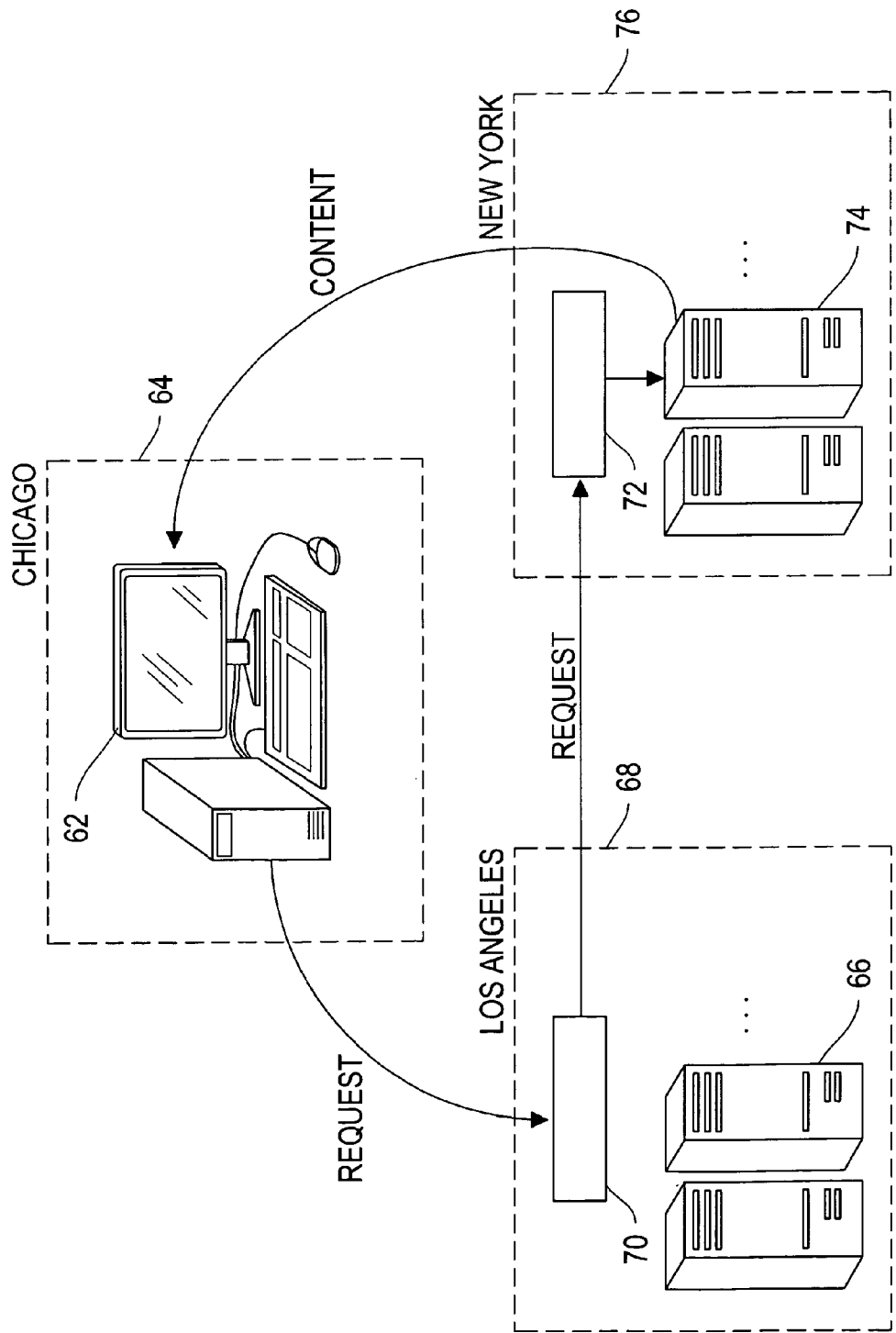
FIG. 5 pictorially illustrates the process depicted in FIG. 4.

FIG. 5 pictorially illustrates the process shown in FIG. 4. In particular, FIG. 5 shows that a client 62 in the geographic region of Chicago 64 may make a content request that is resolved to an edge server 66 located within the geographic region of Los Angeles 68. The Los Angeles edge server 66 may be associated with a load balancing server 70 that can receive the incoming request and determine which edge serve on the content delivery network is best suited for handling this request. For example, the load balancing server 70 may determine that an edge server 74 located within the geographic region of New York 76 is best suited for delivering the content requested by the client. As shown pictorially in FIG. 5, the load balancing server 70 of the Los Angeles edge server 66 redirects the request to the load balancing mechanism 72 of the New York edge server 74. In some embodiments, the load balancing server 72 may, at its option, determine another edge server that is the most appropriate server for delivering this content. In some embodiments, the load balancing server 72 may determine that an earlier selection of an edge server to deliver the content has already been made, such as a selection of edge server 74 at load balancing server 70, and, as shown in the FIG. 5, may activate the edge server 74 to deliver content directly to the client 62.

Although the above figures graphically depict the servers, such as the load balancing server, as a functional block element, it will be apparent to one of ordinary skill in the art that these elements can be realized as computer programs or portions of computer programs that are capable of running on the data processor platform to thereby configure the data processor as a system according to the invention.

Moreover, it will be apparent to those skilled in the art that depicted load balancing server may be realized as a software component operating on a conventional data processing system such as a Unix server. In that embodiment, the load balancing server may be implemented as a C language computer program, or a computer program written in any high level language including C++, Fortran, Java or BASIC. Additionally, in an embodiment where microcontrollers or DSPs are employed, the load balancing server may be realized as a computer program written in microcode or written in a high level language and compiled down to microcode that can be executed on the platform employed. The development of such server processes and programs is known to those of skill in the art, and such techniques are set forth in, for example, Stephen G. Kochan, Programming in C, Hayden Publishing (1983).

Figure 6A:
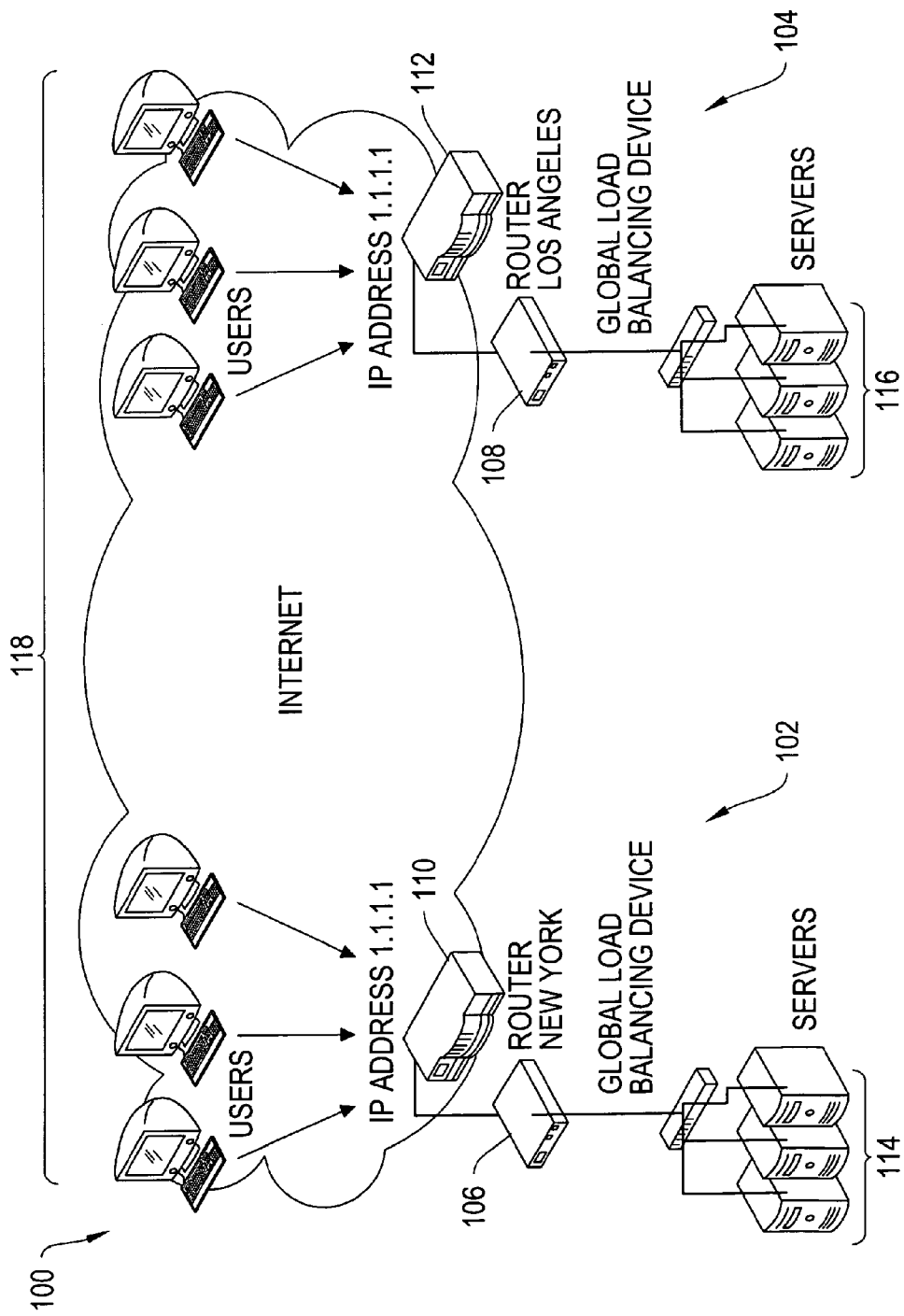
FIGS. 6A and 6B depict an exemplary content delivery network having a global load balancing system capable of responding to the failure of an edge server of the content delivery network, according to an illustrative embodiment of the invention.
Figure 6B:
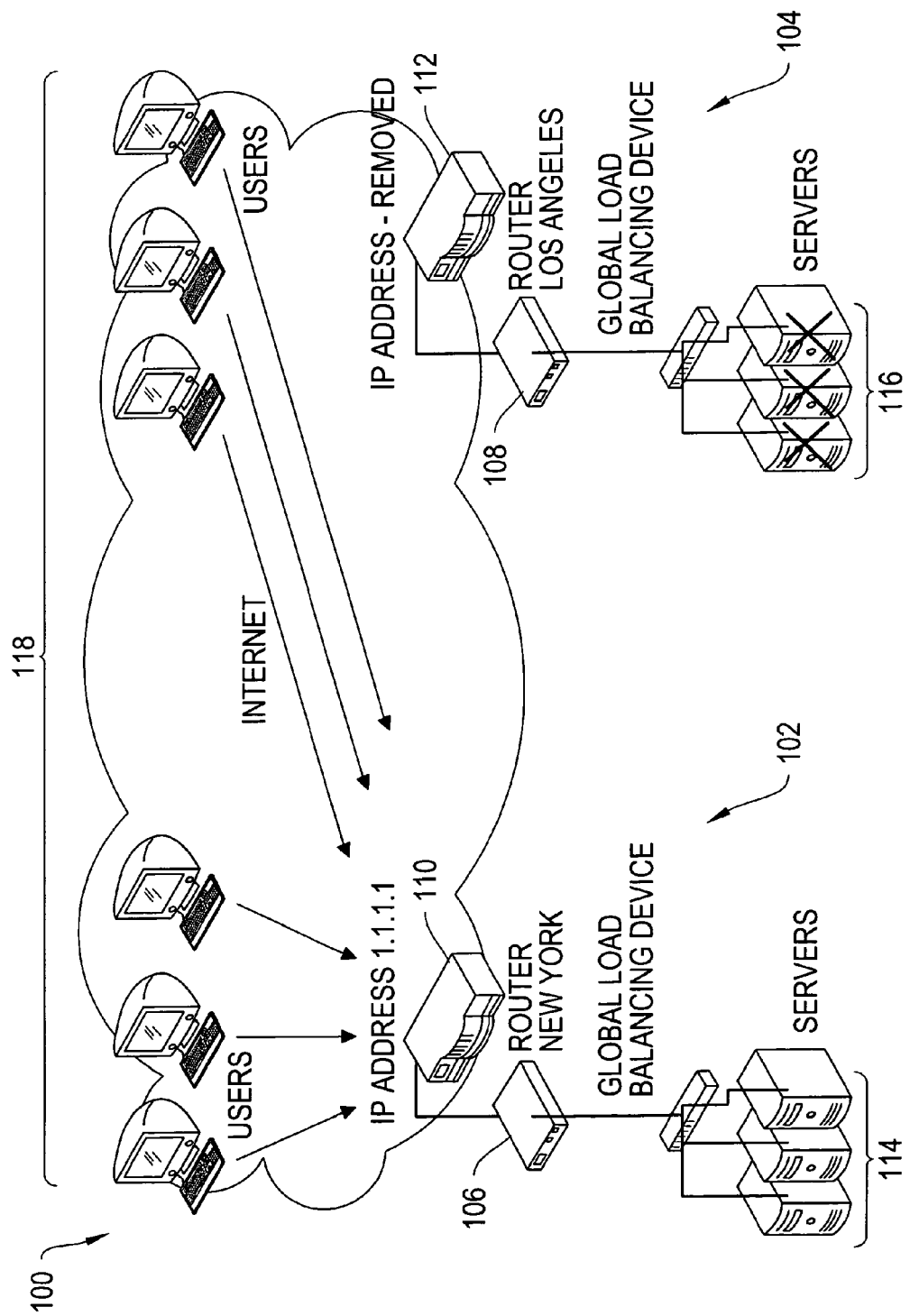

FIGS. 6A and 6B depict an exemplary content delivery network 100 having a global load balancing system capable of responding to the failure of an edge server of the content delivery network 100, according to an illustrative embodiment of the invention. FIGS. 6A and 6B show two geographical locations, New York 102 and Los Angeles 104, in the content delivery network 100 that advertise identical IP addresses on the Internet. In particular, load balancing servers 106 and 108 are located at locations New York 102 and Los Angeles 104, respectively, and associated with routers 110 and 112, respectively, each having a routing table that advertises a set of IP addresses, where the same IP addresses may be advertised by both routing tables, such as IP address 1.1.1.1 as depicted in FIG. 6A. In some embodiments, users at clients 118 that access IP address 1.1.1.1 will be routed to the closest location 102 or 104 from a network proximity stand point. The load balancing server 106 of location New York 102 associates the IP addresses advertised by the routing table of router 110 to a set of edge servers 114 of location New York 102. Similarly, the load balancing server 108 of location Los Angeles 104 associates the IP addresses advertised by the routing table of router 112 to a set of edge servers 116 of location Los Angeles 104. At each location, the load balancing server may receive packets from clients 118 requesting the IP addresses that are advertised at the location and distribute the received packets amongst the set of edge servers of the location so as to distribute the traffic load, formed by having to respond to the received packets, amongst the edge servers.

FIG. 6B depicts an exemplary edge server failure in which the set of edge servers 116 of location Los Angeles 104 have failed, namely are unable to deliver content in response to a packet requesting content from a client. In response to the failure, the IP address 1.1.1.1 may be removed from the set of IP addresses advertised by the routing table at location Los Angeles 104 so that packets from clients requesting IP address 1.1.1.1 no longer are transmitted to the load balancing server 108 and may instead be transmitted to a location whose routing table is still advertising IP address 1.1.1.1, such as the routing table of location New York 102. Other IP addresses advertised by the routing table at location Los Angeles 104, which are identical to IP addresses advertised elsewhere, may also be removed in response to the edge server failure. In some embodiments, the load balancing server 108 or the router 112 may have an input port for receiving data indicative of a performance status of at least one of the edge servers 116 and a processor for managing the set of IP addresses advertised by the routing table of the router 112 based at least in part on the performance status detected by the input port. The performance status indicates how well an edge server will deliver content identified by an IP address. For example, the performance status may indicate that the edge server has failed. Alternatively or additionally, the performance status may indicate that the edge server's delivery of content in response to a packet requesting content does not satisfy a desired quality of service level, such as delivering the requested content without exceeding a maximum amount of delay, or at a minimum data rate of delivery, or within certain tolerances intended to ensure a mostly consistent data rate of delivery. The performance status may indicate a traffic load being supported, such as an amount of client requests being responded to by an edge server and/or an amount of content being delivered by an edge server. In some embodiments, the processor uses a Border Gateway Protocol to manage the set of IP addresses advertised by a routing table of a router.

Similarly, the IP address 1.1.1.1 may be added back to the set of IP addresses advertised by the routing table at location Los Angeles 104 if one or more of the edge servers 116 recovers, as indicated by performance status, so that packets from clients requesting IP address 1.1.1.1 may once again be transmitted to the load balancing server 108 to be distributed to the edge servers 116. In particular, the performance status may indicate that the edge server is capable of delivering content in response to a packet requesting content and/or that the delivery of content in response to a packet requesting content satisfies a desired quality of service level.

Figure 7A:
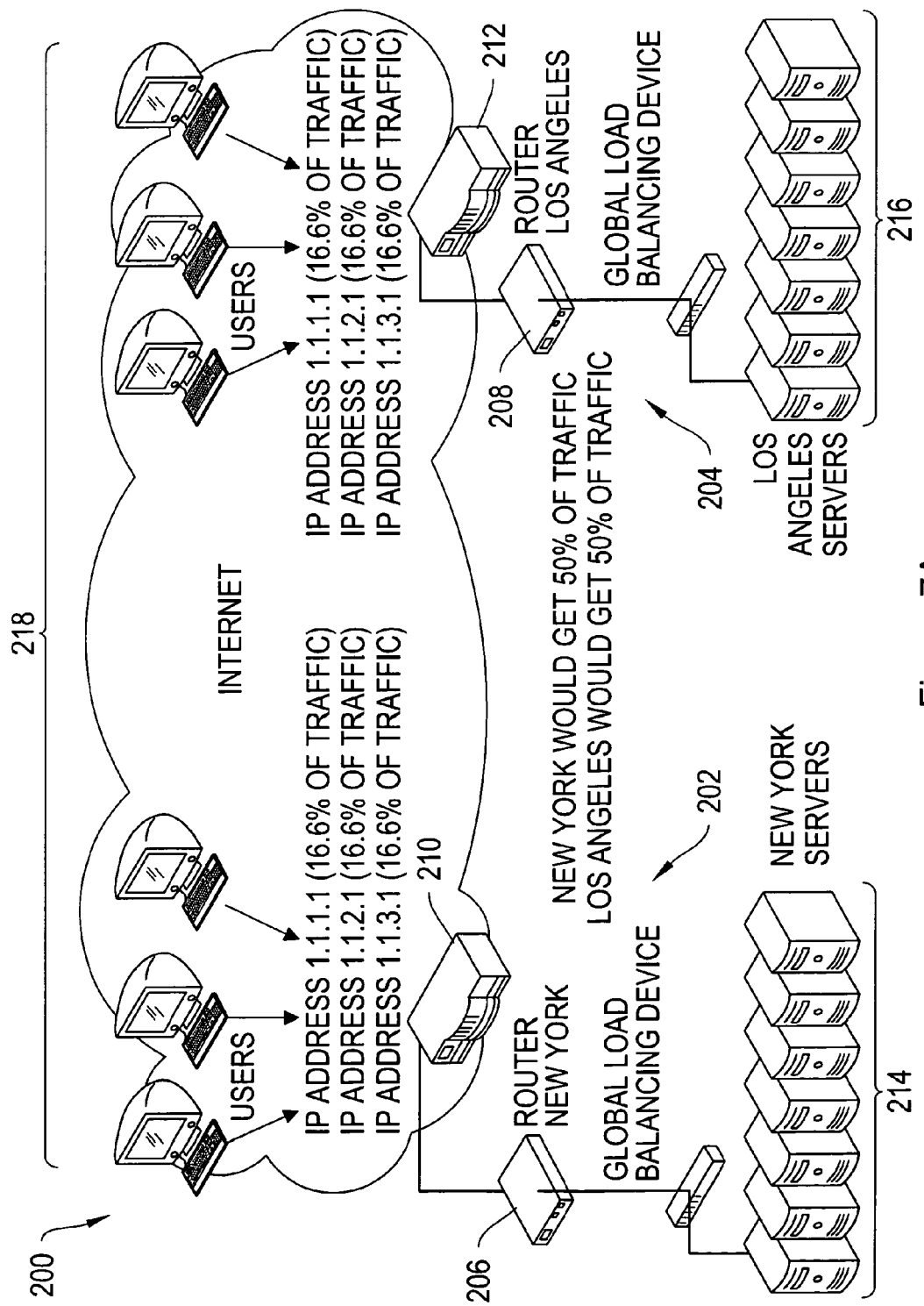
FIGS. 7A and 7B depict an exemplary content delivery network having a global load balancing system capable of regulating relative traffic loads distributed across multiple geographic locations of the content delivery network, according to an illustrative embodiment of the invention.
Figure 7B:
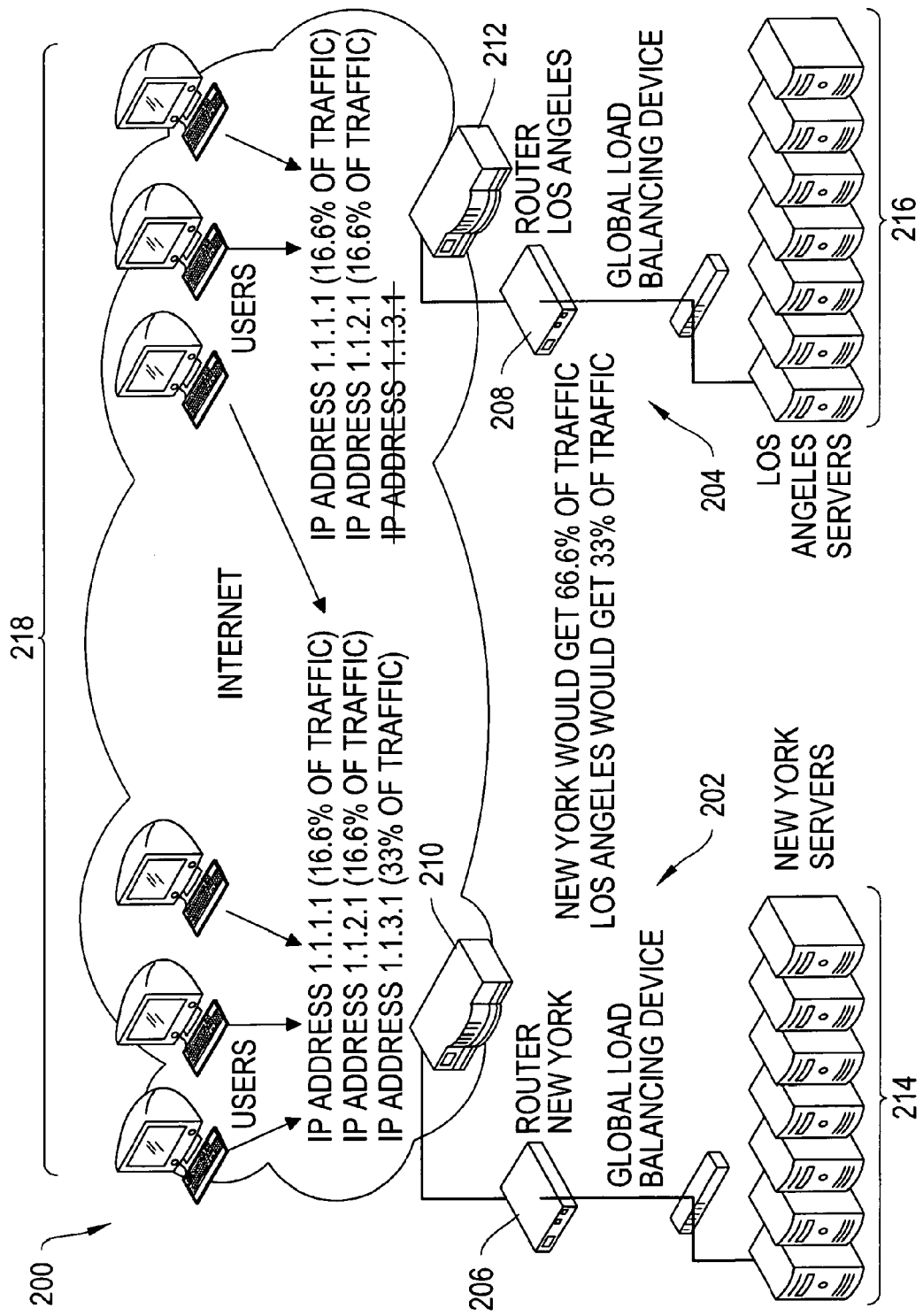

FIGS. 7A and 7B depict an exemplary content delivery network 200 having a global load balancing system capable of regulating relative traffic loads distributed across multiple geographical locations of the content delivery network 200, according to an illustrative embodiment of the invention. Content delivery network 200 is similar to the content delivery network 100 depicted in FIGS. 6A and 6B, where locations 202 and 204, load balancing servers 206 and 208, routers 210 and 212, sets of edge servers 214 and 216, and clients 218 are similar to locations 102 and 104, load balancing servers 106 and 108, routers 110 and 112, sets of edge servers 114 and 116, and clients 118, respectively. FIG. 7A depicts the same set of IP addresses, namely IP addresses 1.1.1.1, 1.1.2.1, and 1.1.3.1, being advertised at both the New York location 202 and the Los Angeles location 204, in particular by the routing tables of routers 210 and 212. In some embodiments, users at clients 218 that access one of these IP addresses will be routed to the closest location 202 or 204 from a network proximity stand point. By having multiple, identical IP addresses advertised at each location, the traffic load generated by client requests is distributed among the IP addresses and among the locations. By removing or adding IP addresses from the set of IP addresses advertised at a location, the content delivery network 200 may regulate the relative amount of traffic load received at the location. Generally, removing an IP address at a location results in fewer client requests being received at the location, thereby decreasing its traffic load relative to other locations, and conversely adding an IP address at a location results in more client requests being received at the location, thereby increasing its traffic load relative to other locations.

In the example depicted in FIG. 7A, each non-identical IP address receives an equal distribution of the traffic load and each location receives an equal distribution of the traffic load, resulting in each IP address at a location receiving one-sixth, or 16.6%, of the traffic load. Continuing this example in FIG. 7B, one of the IP addresses, namely IP address 1.1.3.1, may be removed from the set of IP addresses advertised by the routing table of router 212 at location Los Angeles 204. All client requests for IP address 1.1.3.1 are then received by load balancing server 206 at location New York 202, so that the IP address 1.1.3.1 advertised by the routing table of router 210 at location New York 202 receives double, namely one-third or 33%, of the traffic load. This increase in traffic load results in the New York location 202 receiving two-thirds of the traffic load, as opposed to the 50% it received prior to the IP address removal, and the Los Angeles location 204 receiving one-third of the traffic load, as opposed to the 50% it received prior to the IP address removal.

Generally, adding or removing a determined number of IP addresses from a set of IP addresses advertised at a location may result in a substantially proportionate increase or decrease in traffic load received at the location, allowing a content delivery network to regulate the percentages of traffic load distributed amongst its multiple geographic locations. For example, a content delivery network can advertise the same set of IPs from all of its geographic locations or some of them. Or the content delivery network can choose to advertise a greater number of IP addresses to control the user traffic at a finer granularity level. For example, by using twenty IP addresses or address blocks, the content delivery network can divide the traffic into 5% increments, and by not advertising one IP address at one location forcing 5% of users to go to another location. It will also be understood that the systems described herein provide advantages over the prior art including the ability to route users directly to servers without using Domain Name Servers, thereby significantly speeding the connection time for end users.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A content delivery network (CDN) comprising:
a first Point-of-Presence (POP) comprising a first load balancing server and a first set of edge servers, the first load balancing server assigned a particular Internet protocol (IP) address such that a request for content addressed to the particular IP address originating from a first region that is proximate to the first POP is routed to the first load balancing server; and
a second POP comprising a second load balancing server and a second set of edge servers, the second load balancing server assigned the same particular IP address as the first load balancing server such that a request for the content addressed to the particular IP address originating from a second region that is proximate to the second POP is routed to the second load balancing server, the second load balancing server comprising:
a processor (i) processing a set of parameters to identify whether the first POP offers improved delivery of content relative to the second POP or the second POP provides improved delivery of the content relative to the first POP and (ii) selecting an edge server of the first set of edge servers when the processor determines that the first POP provides improved delivery for the content relative to the second POP based on the set of parameters; and a packet switch forwarding a received request for the content to the first POP when the processor determines that the first POP provides improved delivery for the content relative to the second POP based on the set of parameters.

2. The CDN of claim 1, wherein the packet switch forwards the received request from the second load balancing server to the selected edge server of the first set of edge servers.

3. The CDN of claim 1, wherein the packet switch forwards the received request from the second load balancing server to the first load balancing server for subsequent forwarding of the request from the first load balancing server to the selected edge server of the first set of edge servers.

4. The CDN of claim 1, wherein the packet switch is further for forwarding the received request for the content to an edge server selected from the second set of edge servers when the processor determines that the second POP provides improved delivery for the content relative to the first POP based on the set of parameters.

5. The CDN of claim 1, wherein the second load balancing server further comprises an input port receiving the request, the request originating from the second region and addressed to the particular IP address.

6. The CDN of claim 1, wherein the set of parameters comprises cost of delivering content from an edge server of at least the second set of edge servers to a recipient that originates the request.

7. The CDN of claim 1, wherein the set of parameters comprises at least one of server load, server availability, and network latency for an edge server of at least the second set of edge servers.

8. The CDN of claim 1, wherein the packet switch forwards the request with an address, the address for delivering the content directly to a requestor that originates the request while bypassing a return path through any of the first and second load balancing servers.

9. The CDN of claim 1 further comprising (i) a first router associated with the first POP, the first router advertising the particular IP address to at least one other router that is proximate to the first POP and (ii) a second router associated with the second POP, the second router advertising the particular IP address to at least one other router that is proximate to the second POP.

10. A method of load balancing across a content delivery network (CDN), the CDN comprising a first Point-of-Presence (POP) and a second POP from which content is distributed on behalf of others by the CDN, the first POP geographically separated from the second POP, the method comprising:
configuring the CDN for Anycast routing by (i) assigning a particular IP address to the first POP and (ii) assigning the same particular IP address to the second POP, wherein said assigning the particular IP address to the first POP facilitates routing to the first POP, a request for content that is addressed to the particular IP address and that originates from a first region that is proximate to the first POP, and wherein said assigning the particular IP address to the second POP facilitates routing to the second POP, a request for the content that is addressed to the particular IP address and that originates from a second region that is proximate to the second POP;
monitoring a set of parameters relating to performance of at least the first POP and the second POP;
receiving at the first POP, a request for content that is addressed to the particular IP address and that originates from the first region;
determining by the first POP, based on the set of parameters whether the second POP provides improved delivery of the content relative to the first POP; and
selecting by the first POP, an edge server operating in the second POP when the second POP provides improved delivery of the content relative to the first POP: and
forwarding the request to the second POP when the second POP provides improved delivery of the content relative the first POP.

11. The method of claim 10 further comprising selecting an edge server operating in the first POP and forwarding the request to the edge server when the first POP provides improved delivery of the content relative to the second POP.

12. The method of claim 10, wherein the selected edge server, in response to receiving the request, sends the content to a requestor that originates the request.

13. The method of claim 10, wherein determining based on the set of parameters comprises determining based on at least one of cost of delivery, server load, server availability, file type, and network latency whether the second POP provides improved delivery of the content relative to the first POP.

14. A method of balancing load across a CDN having at least a first POP and a second POP, the first POP comprising a first set of edge servers located proximally to a first region, the second POP comprising a second set of edge servers proximally located to a second region that is geographically separated from the first region, the method comprising:
providing a first load balancing server at the first POP for balancing a load at least across the first set of edge servers;
assigning to the first load balancing server, a particular IP address that is also assigned to a second load balancing server, the first load balancing server for balancing a load resulting from requests for content that are resolved to the first POP by Anycast routing as a result of the requests being addressed to the particular IP address and originating from the first region, the second load balancing server for balancing a load resulting from requests for the content that are resolved to the second POP by Anycast routing as a result of the requests being addressed to the particular IP address and originating from the second region;
receiving at the first load balancing server, a request for the content that is addressed to the particular IP address and that originates from the first region;
processing the request at the first load balancing server to determine which edge server of the first and second sets of edge servers optimally delivers the content based on a set of performance parameters;
selecting a particular edge server from the second set of edge servers to satisfy the received request by delivering the content when the particular edge server optimally delivers the content relative to other servers of the first and second sets of servers; and
forwarding the received request from the first load balancing server at the first POP to the selected edge server at the second POP for improved delivery of the content.

15. The method of claim 14, wherein the selected edge server, in response to receiving the content request, sends the requested content to a requestor that originates the content request.

16. The method of claim 14, wherein forwarding the content request comprises forwarding the content request from the first load balancing server to the second load balancing server for the second load balancing server to forward the content request to the selected edge server.

17. The method of claim 14 further comprising monitoring at least one of edge server load, edge server availability, file type, network latency, and speed of transfer.

18. The method of claim 17, wherein said selection of the edge server is based on said monitoring identifying that the selected edge server provides improved delivery for the requested content over a server of the first set of servers.

* * * * *